(12) United States Patent
Schmitz et al.

(10) Patent No.: US 12,035,849 B2
(45) Date of Patent: Jul. 16, 2024

(54) PREPARATION VESSEL FOR CONNECTION WITH A LOCKING ASSEMBLY

(71) Applicant: Vorwerk & Co. Interholding GmbH, Wuppertal (DE)

(72) Inventors: Kevin Schmitz, Duesseldorf (DE); Christian Bayard, Witten (DE); Sebastian Jansen, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 459 days.

(21) Appl. No.: 17/193,420

(22) Filed: Mar. 5, 2021

(65) Prior Publication Data
US 2021/0274976 A1 Sep. 9, 2021

(30) Foreign Application Priority Data

Mar. 6, 2020 (EP) ..................................... 20161437

(51) Int. Cl.
*A47J 43/07* (2006.01)
*A47J 43/046* (2006.01)

(52) U.S. Cl.
CPC ......... *A47J 43/0772* (2013.01); *A47J 43/046* (2013.01)

(58) Field of Classification Search
CPC ............................ A47J 43/0772; A47J 43/046
USPC .......................................................... 241/37.5
See application file for complete search history.

(56) References Cited

U.S. PATENT DOCUMENTS

| 5,749,285 | A | * | 5/1998 | Dorner | ................ A47J 43/0727 |
| | | | | | 99/348 |
| 8,382,018 | B2 | * | 2/2013 | Oblak | ..................... A47J 43/06 |
| | | | | | 241/37.5 |
| 2008/0135654 | A1 | * | 6/2008 | Pryor | ................... A47J 43/0716 |
| | | | | | 241/37.5 |
| 2015/0216360 | A1 | * | 8/2015 | Hosner | ................ A47J 43/0766 |
| | | | | | 241/37.5 |

FOREIGN PATENT DOCUMENTS

| EP | 2371251 A1 * | 10/2011 | ............ A47J 27/004 |
| EP | 2 813 165 B1 | 9/2015 | |
| EP | 3651623 A1 * | 5/2020 | .............. A47J 36/10 |

* cited by examiner

*Primary Examiner* — Adam J Eiseman
*Assistant Examiner* — Fred C Hammers
(74) *Attorney, Agent, or Firm* — Collard & Roe, P.C.

(57) ABSTRACT

A preparation vessel for connection with a receiving area of a base unit of an electric motor-driven food processor has a pot, a pot foot that can be connected with the receiving area, and a cover that closes the pot opening of the pot. The preparation vessel has a locking assembly with a locking element for locking the pot with the cover. The pot foot has at least one activating element for activating the locking assembly. The activating element is arranged on the pot foot in such a way that it can be activated by a corresponding activating assembly of the receiving area of the food processor.

14 Claims, 15 Drawing Sheets

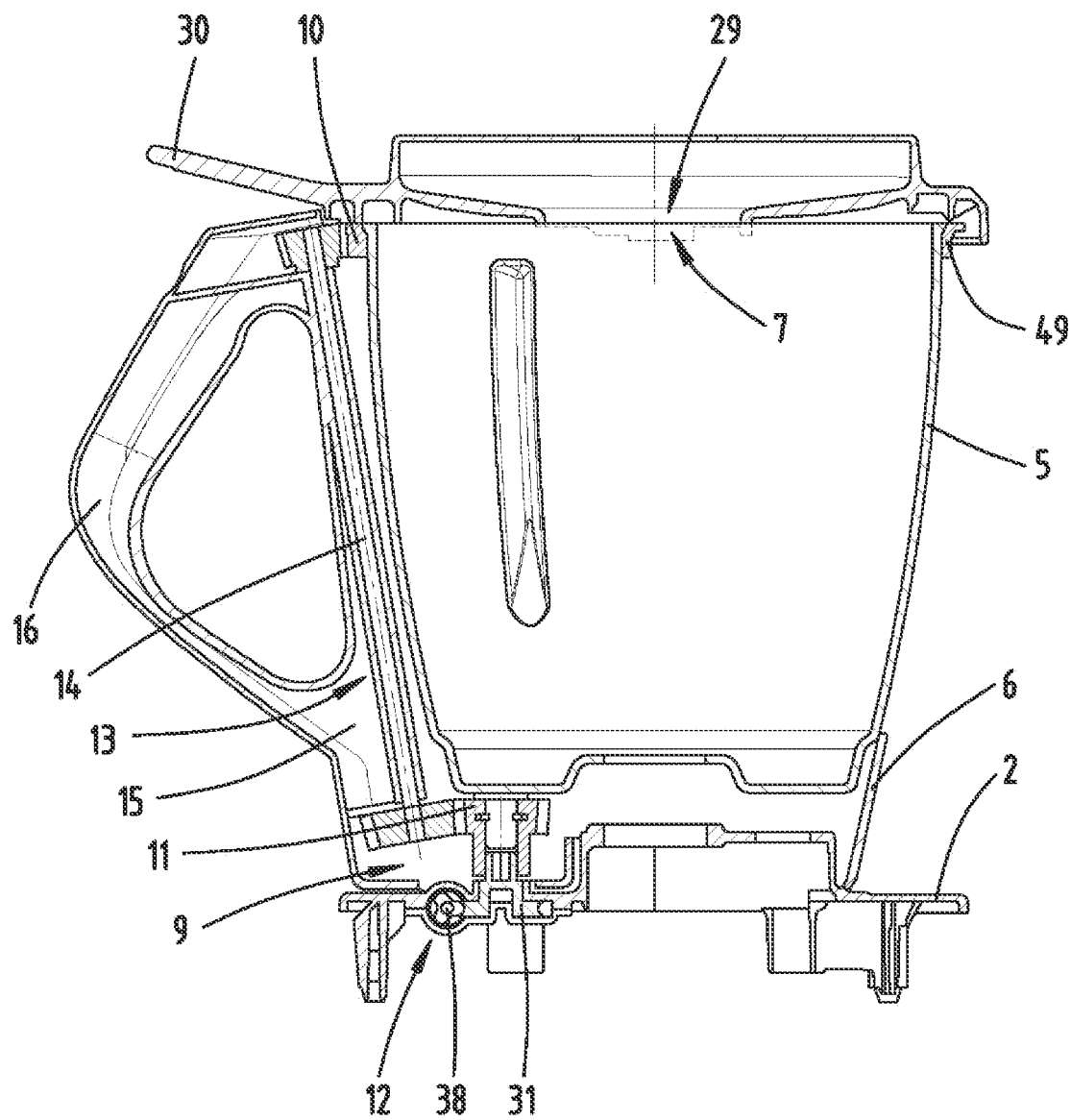

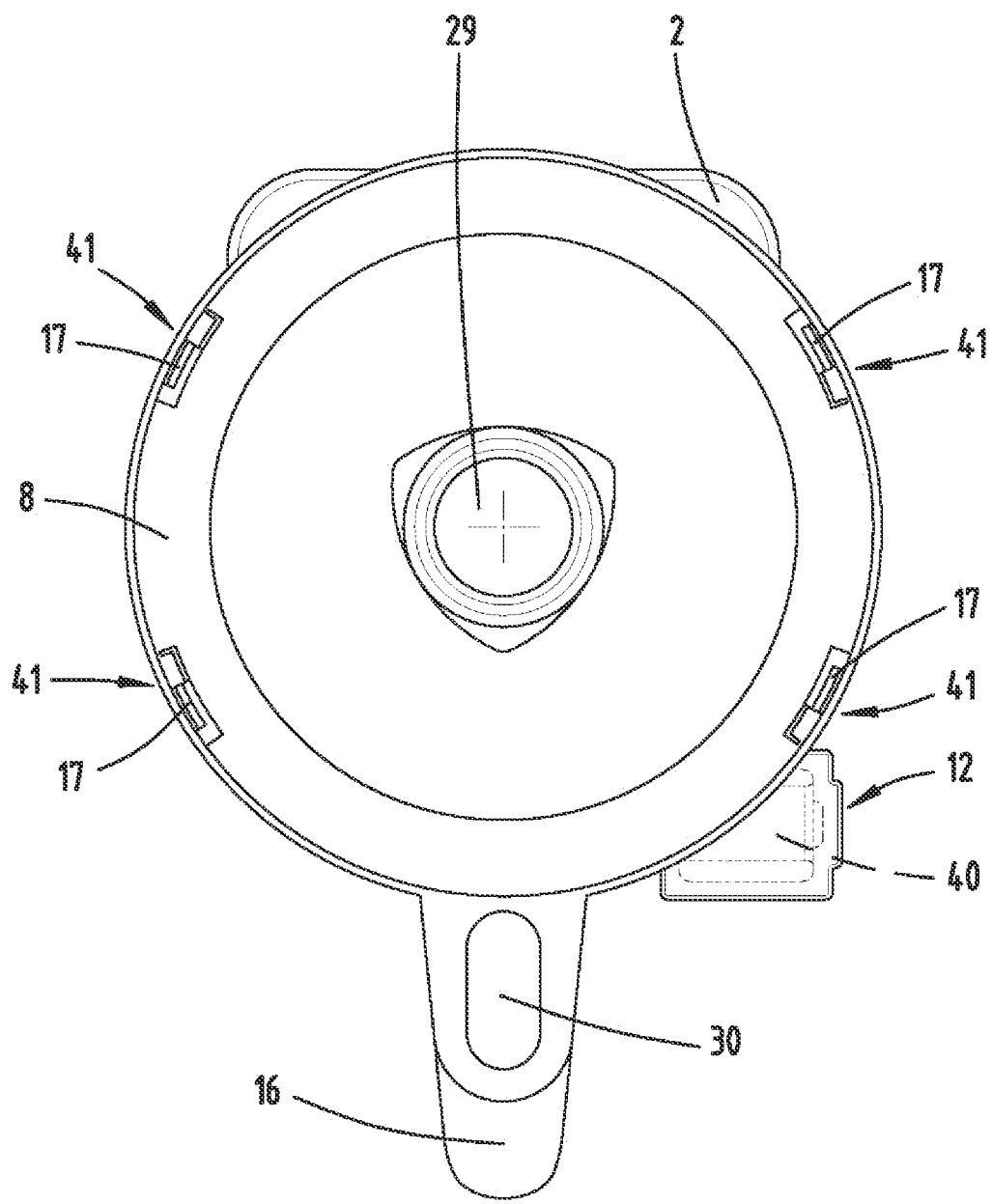

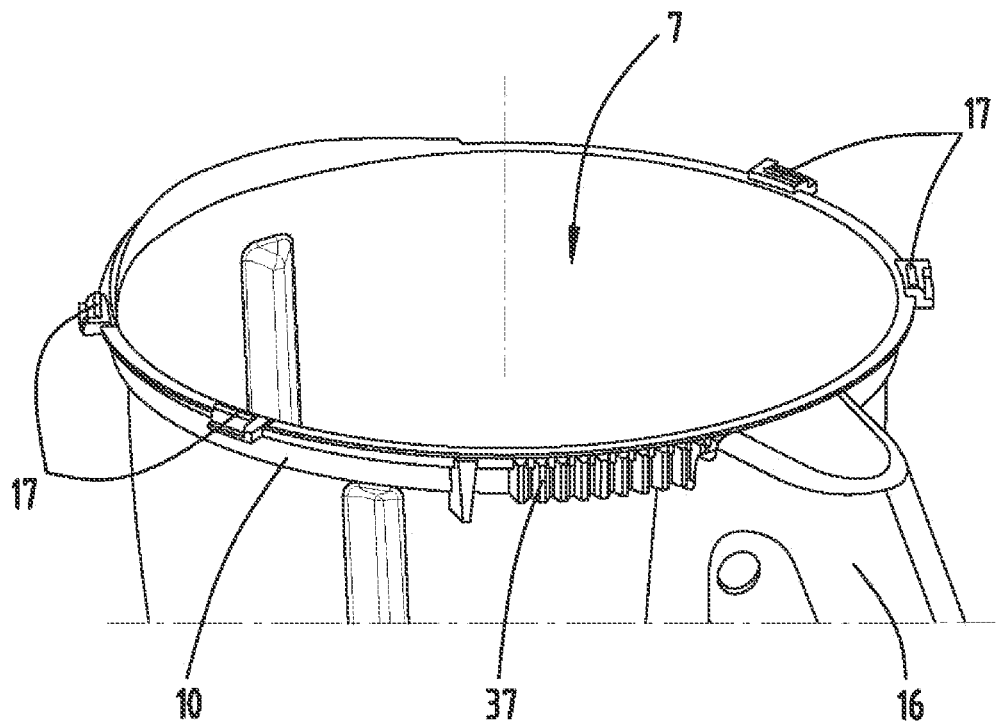

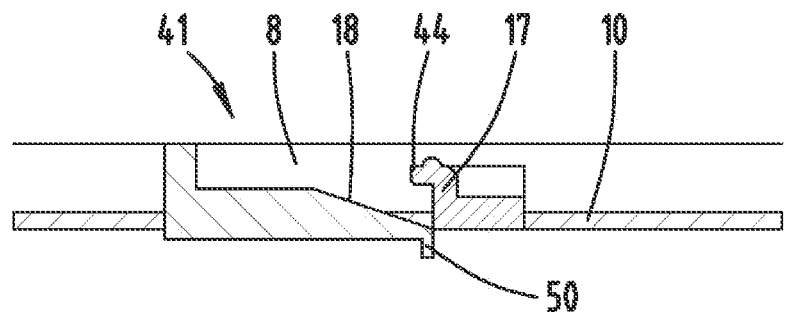
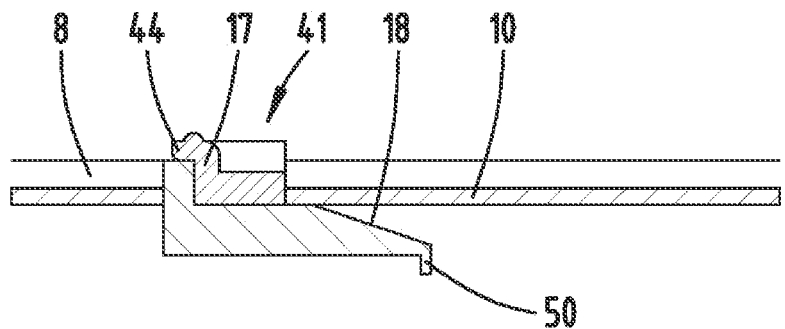
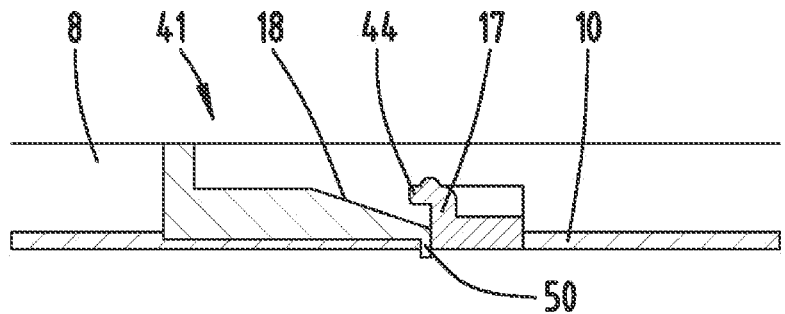

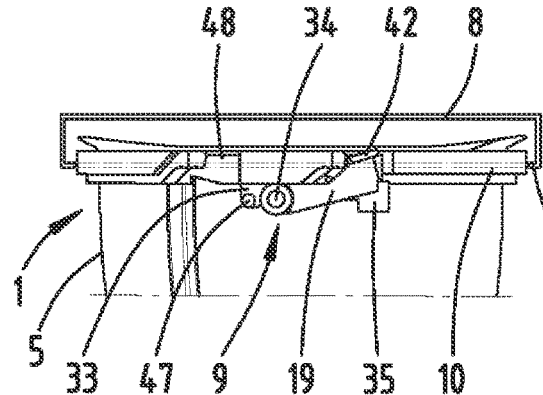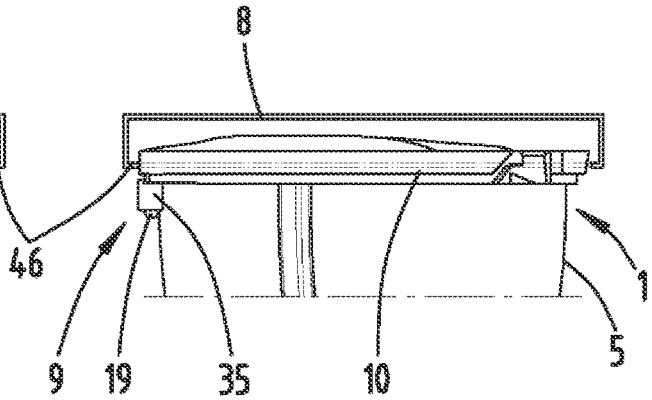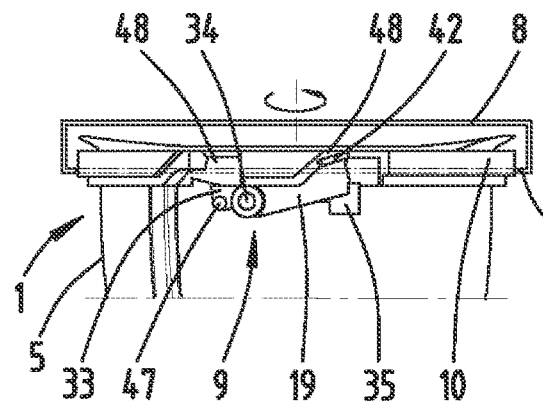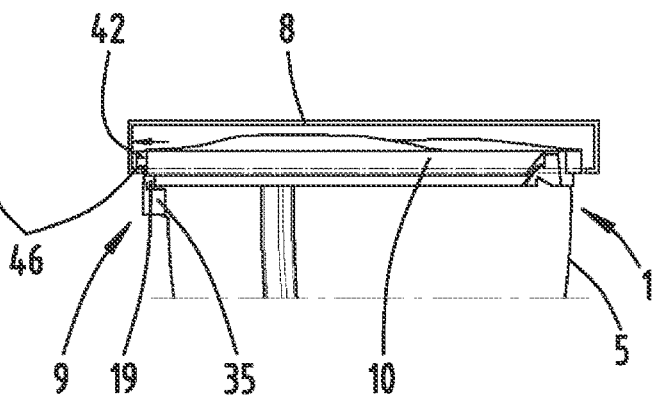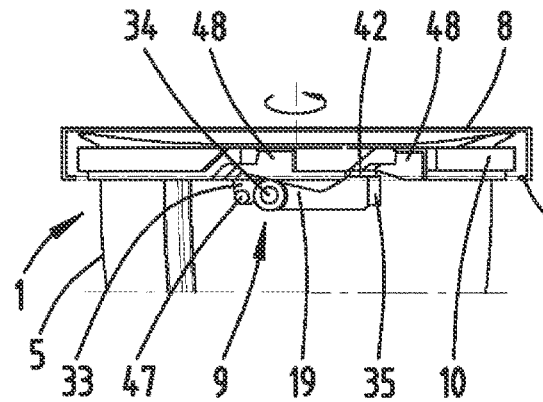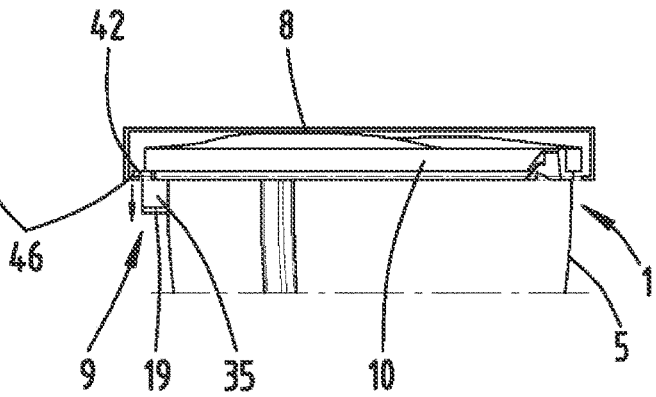

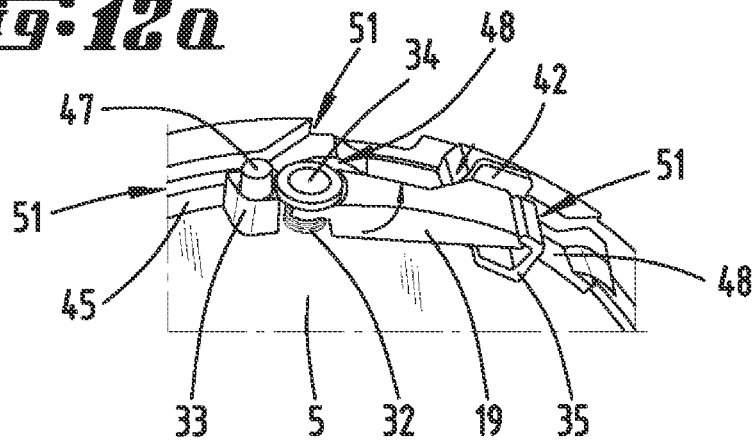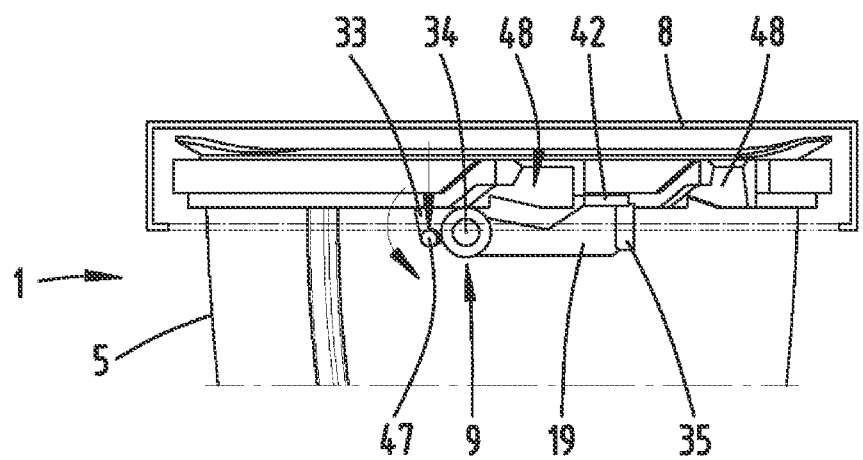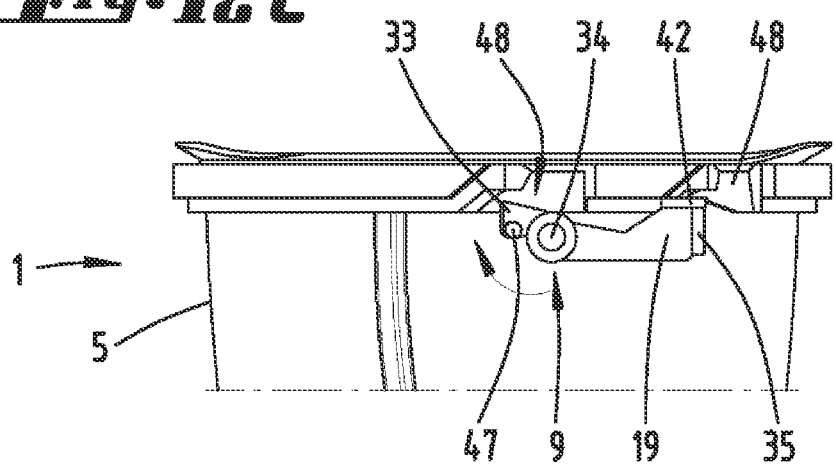

PREPARATION VESSEL FOR CONNECTION WITH A LOCKING ASSEMBLY

CROSS REFERENCE TO RELATED APPLICATIONS

Applicant claims priority under 35 U.S.C. § 119 of European Application No. 20161437.7 filed Mar. 6, 2020, the disclosure of which is incorporated by reference.

BACKGROUND OF THE INVENTION

1. Field of the Invention

The invention relates to a preparation vessel for connection with a receiving area of a base unit of an electric motor-driven food processor, wherein the preparation vessel has a pot, a pot foot that can be connected with the receiving area, and a cover that closes the pot opening of the pot.

The invention further relates to an electric motor-driven food processor, in particular a mixing device, with a base unit and a preparation vessel, which can be connected with a receiving area of the base unit, and has a pot and a cover that closes a pot opening.

2. Description of the Related Art

Preparation vessels and food processors with a preparation vessel are known in the art. For example, the housing of the food processor can have a vessel receiving area, into which the preparation vessel can be inserted, wherein the vessel receiving area is preferably designed at least relative to a partial area corresponding to the preparation vessel in such a way that the preparation vessel can be aligned during connection with the vessel receiving area in relation to both a vertical direction and a peripheral direction of the preparation vessel.

For example, the receiving area can additionally accommodate a rotating shaft, which serves to drive an agitator located in the preparation vessel. The agitator is driven by a food processor-side electric motor for preparing meals. In order to preclude foodstuffs from being sprayed out of the preparation vessel during operation of the food processor, the preparation vessel has a cover which can be locked by means of a locking assembly on the pot.

For example, European Patent No. EP 2 813 165 B1 shows a food processor known in prior art, with a locking assembly for the cover of the preparation vessel. The locking assembly has two locking parts that overlap a pot edge and cover edge, and are designed as locking rollers that rotate around an essentially horizontal axis. The locking rollers can be rotated from a release position into a locked position, and vice versa.

Even though the aforementioned locking assembly has proven effective for reliably locking the cover on the pot, this embodiment requires that a specific preparation vessel, in particular one matching the height of the locking rollers, also be used with a specific base unit of the food processor. As a result, it might not be possible to use different preparation vessels in conjunction with the food processor, in particular preparation vessels with differing heights.

SUMMARY OF THE INVENTION

Proceeding from the aforementioned prior art, it is therefore the object of the invention to provide a preparation vessel for a food processor, which allows the cover to be locked with the pot, and which can be connected with a base unit of the food processor regardless of an installation height of the preparation vessel.

In order to achieve the aforementioned object, it is proposed that the preparation vessel have a locking assembly with a locking element for locking the pot with the cover, wherein the pot foot has at least one activating element for activating the locking assembly, wherein the activating element is arranged on the pot foot in such a way that it can be activated by a corresponding activating assembly of the receiving area of the food processor.

According to the invention, the locking assembly that serves to lock the cover with the pot is located on the preparation vessel itself. This eliminates the need for a locking assembly formed on the food processor, which to perform a proper locking function would require a specific geometry, in particular height, of the preparation vessel. The inventive preparation vessel is designed in such a way by the activating element provided on the pot foot that the locking assembly of the preparation vessel can be activated by means of an activating assembly of the food processor receiving the preparation vessel. The activating element is preferably located on the bottom side of the preparation vessel, so that the latter comes into contact with an element of the food processor-side activating assembly while connecting the preparation vessel with the receiving area of the base unit. In one embodiment, the locking assembly can have bayonet locking elements correspondingly formed on the pot and cover as the locking element, for example, and provide a tooth system on one of the bayonet locking elements, for example, into which a partial area of a drive element engages so as to rotate the two bayonet locking elements relative to each other. In particular by designing one of the corresponding bayonet locking elements like a ramp, for example, the bayonet locking element can induce an axial displacement of the cover in the direction of the pot, so that the cover is pressed onto the edge of the pot opening, so that a tight, in particular fluid-tight, closure of the preparation vessel takes place. The proposed embodiment is only one of a plurality of conceivable embodiments of the invention, which will be described in even more detail. In any event, it is essential in terms of the invention that the locking assembly for locking the cover with the pot belong exclusively to the preparation vessel, and that an interface be provided only on the pot foot of the preparation vessel that allows the locking assembly of the preparation vessel to be activated by an activating assembly of a base unit of a food processor. The interface is preferably located under the preparation vessel, i.e., in the area of an essentially horizontal contact surface between the receiving area of the base unit and the pot foot of the pot of the preparation vessel, so that the preparation vessel can have a wide variety of shapes, in particular in terms of its height and/or diameter. This facilitates a compatibility between various preparation vessels and various base units of a food processor.

It is proposed that the locking assembly have a drive assembly that drives the locking element and is mechanically operatively connected with the activating element. The drive assembly of the preparation vessel serves to transmit mechanical forces from an activating assembly of a food processor to the locking element of the locking assembly of the preparation vessel. For example, the activating assembly of the food processor can have an electric motor, which directly drives the activating element of the preparation vessel, or preferably acts on the activating element with a gearbox interspersed. For example, the gearbox of the food processor can have a plurality of tooth elements, for example a spur gearbox and a worm gearbox, and act on the activating element of the preparation vessel with a gear element driven last in the impact chain. The activating element of the preparation vessel, for example a toothed wheel arranged in the pot foot of the preparation vessel, is part of the vessel-side drive assembly, which is mechanically operatively connected with the activating assembly of the food processor. Finally, the activating element of the preparation vessel transmits the drive force via the drive assembly to the locking element, which induces the locking of the cover on the pot.

According to a preferred embodiment, the drive assembly can have a drive element, which is guided through a wall of the pot and/or a handle of the pot, proceeding from the pot foot to the cover. In particular, the drive element can be a rotating shaft. In this embodiment, the locking assembly can be made out of particularly few individual parts. In particular, the activating element of the locking assembly in the pot foot can be directly connected with the drive assembly, which in the area of the vessel opening then acts on the locking element, so as to ultimately bring about the locking of the cover with the pot. A rotating shaft is particularly suitable as a drive element, since it can be integrated in a space-saving manner into a wall of the pot and/or a handle of the pot. This yields an embodiment in which all elements of the drive assembly are integrated into the housing of the preparation vessel, and do not protrude to the outside, where a user of the preparation vessel could injure him/herself or residual foodstuffs or dirt can be deposited. Last but not least, this also makes it easier to clean the preparation vessel. A cavity can be provided in the wall of the pot or in the handle, into which extends the drive element, preferably a rotating shaft. The drive element, preferably the rotating shaft, can act on the locking element of the locking assembly in the area of the pot opening. For example, a partial area of the drive element can have a tooth system that engages into a corresponding tooth system of the locking element.

According to a special embodiment, the locking element can be a locking ring that is rotatably mounted on the pot or the cover and envelops the pot opening in a state closed by means of the cover, wherein the locking element has allocated to it a drive assembly that is set up to rotate the locking element around the pot opening. For example, the locking ring can on its part directly bring about a locking between the pot and cover, or initially act on an intermediate element, which then brings about the locking. For example, the locking ring can provide an element of a bayonet lock and/or a connecting link with ramps or the like, which enable in particular an axial displacement of the cover relative to the pot. As a result, the cover can be pushed or pulled onto the pot, and in particular tensioned in such a way as to ensure a fluid-tight locking of the pot. According to this embodiment, the locking element is not immovably connected with the pot or cover, but rather can rotate relative thereto. As a result, only the locking element of the drive assembly must be rotated, and not the entire cover. This makes it possible to use lighter and/or smaller components and/or an electric motor with less power for the drive assembly of the preparation vessel as well as the activating assembly of the food processor, which saves on weight and costs during the manufacture of the preparation vessel and/or food processor.

It is proposed that the locking element have at least one active element, which as the locking element rotates is designed to induce an axial displacement of the cover toward the pot and/or a tensioning of the cover acting radially to the outside. For example, such an active element can be a ramp, which is formed on the locking element designed as a locking ring in the locking direction. In this case, the locking element has a guiderail, along which a corresponding partial area of the cover or pot can glide. In addition, the active element can also be a partial element of a bayonet lock, for example, wherein a partial area of the locking element engages into a corresponding opening of the cover or pot. In each case, the active element is designed in such a way that, given a rotation of the locking element, an axial displacement of the cover relative to the pot and/or a tensioning of the cover in a radially outwardly facing direction takes place. The active element of the locking element contacts the respective partial area of the cover or pot, and forces the cover into the desired locking position. In this regard, the active element comprises a guiding element of a guiding assembly or guiderail. For example, the locking element can also be an elastic locking ring, which is rotatably mounted on the pot, and during a rotation expands along a connecting link of the pot, and is additionally axially displaced in the longitudinal extension of the pot. During expansion, the locking ring plunges into an undercut of the cover, for example, and moves it into a locking position. The radial and axial displacement motions here preferably take place one after another, with it being preferred that the first movement be toward the outside, and then in a longitudinal direction of the pot. As an alternative to an elastic design of the locking ring, the locking ring can also have partial elements movably mounted on a base body, which during rotation can be displaced radially outward. Furthermore, the locking ring can also be slotted relative to one or several peripheral partial areas, so that a corresponding connecting link element can at least temporarily engage into the locking ring, thereby resulting in a change in diameter of the locking ring.

In one possible embodiment, it is proposed that the active element be able to engage into a corresponding opening of the cover or pot to form a bayonet lock, wherein the active element or a partial area of the cover or pot has a ramp that ascends in the locking rotational direction, and induces an axial displacement of the cover relative to the pot, and thus a locking of the pot with the cover. According to this embodiment, the active element forms a partial element of a bayonet lock. The corresponding element of the bayonet lock is here a partial area of the cover or pot with an opening. The active element engages into the opening and follows an ascending ramp during rotation of the locking element, which results in an axial displacement of the cover relative to the pot. The ramp can be formed on the active element itself, wherein one partial area of the active element engages through the opening of the cover or pot in the sense of a bayonet lock, and another partial area of the active element has the ramp or glides along a corresponding ramp of the cover or pot. The active element and ramp can also be locally separated from each other, wherein the active element only has the function of engaging into the openings of the bayonet lock, and the ramp ensures that the cover is tensioned relative to the pot. In this sense, two embodiments having the same effect are possible. In a first embodiment, the rotating locking ring can be mounted on the pot of the preparation vessel and engage into corresponding bayonet contours of the cover, and thereby pull the cover in the direction of the pot. According to an alternative embodiment, the rotating locking element can be a locking ring mounted on the cover, which engages into corresponding bayonet contours of the pot, and thereby displaces the cover in the direction of the pot. The correct function of the bayonet lock depends on a directed placement of the cover on the pot, so that corresponding elements of the bayonet lock can engage into each other. In order to further prevent the cover from also moving while activating the locking ring, the pot and/or the cover preferably have stop elements, which serve as an anti-twist device. In order to further be able to detect whether the cover is correctly locked with the pot, the corresponding bayonet elements of the bayonet lock can be equipped with end stops. If the cover has been correctly placed on the pot at the beginning of the locking motion, the locking ring can be rotated until an end stop on the corresponding bayonet element has been reached. If the cover has not been correctly placed, for example is slanted, the locking ring cannot be rotated until the end stop. If no cover has been placed on the pot at all, the locking ring can be rotated by a defined measure, since the locking ring does not bump into a stop element. By evaluating a current rotational position of the locking ring, it can thus be determined whether a cover has been placed on the pot or whether the cover has been correctly locked with the pot.

An alternative embodiment of the invention can provide that the pot or cover have an intermediate element movably mounted on the pot or cover, wherein the active element of the locking element is designed to press the intermediate element in an axial and/or radial direction against a partial area of the cover or pot during a rotation of the locking element, and thereby induce a locking of the pot with the cover. According to this embodiment, the cover is not locked directly with the pot by means of the locking element. Rather, the active element of the locking element initially acts on an intermediate element, which then brings about the locking between the cover and pot. As a result, locking can be reliably achieved regardless of a rotational position of the cover on the pot. Comfort for the user is enhanced, since this embodiment enables a reliable locking even given an undirected placement of the cover on the pot. The intermediate element can be mounted on the pot or cover so that it can move in an axial and/or radial direction, wherein the cover placed on the pot initially presses the intermediate element away in a radial and/or axial direction, such that the latter in turn acts on a corresponding partial area of the cover or pot, and thereby brings about a locking between the pot and cover. The locking element can preferably have several connecting link elements in the peripheral direction, which act on one or several intermediate elements in the sense of a guiderail. In particular, it can be provided that the active element of the locking element provide a guiderail which, given contact with the intermediate element and continued rotation of the locking element in the locking direction, induces a displacement of the intermediate element in both the radial direction and axial direction. For example, the intermediate element can initially be displaced in an outwardly facing radial direction in relation to the pot interior, wherein the intermediate element engages behind an undercut formed on the cover. As the locking element continues to rotate, the intermediate element is then displaced in the longitudinal direction of the pot by a corresponding shaping of the active element. In the process, the intermediate element takes the cover along until the latter reaches an end position. In order to unlock the cover again, the locking ring can be rotated in the opposite direction, for example, wherein the intermediate element is again displaced out of the end position by means of a restoring spring, i.e., moves in the direction of the locking element, and the cover can be loosened. Alternatively, the intermediate element can also be moved in reverse by means of a guiderail, or by means of a combination of a restoring spring and a guiderail. In particular, the intermediate element can be mounted on the pot or cover so that it can pivot in the axial and/or radial direction. Alternatively, it is possible that the intermediate element be a second rotating ring relative to the locking ring, which can be manipulated by means of the locking ring, for example in such a way that, upon contacting the locking ring and rotating in the locking direction, the ring-shaped intermediate element initially expands, and is then displaced in an axial direction, so that during expansion, the intermediate ring engages into an undercut of the cover or pot, for example, and subsequently displaces the cover in an axial direction into a locking position. A detection mechanism can be used to detect whether the cover is actually on the pot and was correctly locked. For example, the detection mechanism can comprise a detection lever, which interacts with the locking ring. The detection lever can be pressed against the locking ring by a spring. The locking ring has a recess. If the cover is not in a position suitable for locking purposes, the spring presses the detection lever into the recess of the locking ring, so that the locking ring is blocked, and cannot be rotated. If the cover was correctly locked, the detection lever is pressed down from an edge of the cover, so that the detection lever cannot engage into the recess of the locking ring. The locking ring can then continue to rotate unimpeded. For example, the rotational position achieved as a result can be detected by acquiring and evaluating a rotational angle of the locking ring, for example by determining a number of revolutions of a rotating shaft of a drive motor of the activating mechanism of the food processor. A blocked locking ring can further be recognized by evaluating a motor current, for example. In a case where the cover was not correctly placed on the pot, the locking ring is blocked before a defined rotational position has been reached. This state is interpreted as a faulty locking state. By contrast, if the cover has been correctly placed, the locking ring can continue to rotate until the defined rotational position has been exceeded. This state is then interpreted as a correctly locked cover. Arranging several detection levers and recesses on the periphery of the locking ring makes it possible to especially advantageously detect when a locking position has been reached at several peripheral positions of the cover. In this way, it can be ensured that even a cover placed on the pot slanted is recognized as a faulty state, for example.

According to another possible embodiment, the preparation vessel can have a guiderail arranged on the pot with an engaging element mounted in a spiral guideway of the guiderail, wherein the guideway runs around a spiral axis that faces radially outward in relation to an interior of the pot, and wherein a rotation of the locking element produces an axial and radial displacement of the engaging element along the spiral guideway toward a partial area of the cover, until a partial area of the engaging element facing out of the guiderail abuts against the cover, thereby bringing about a locking of the pot with the cover. The cover can be placed on the pot in any rotational position in this embodiment as well. However, the guiderail for bringing about the locking is here not allocated to the locking ring, but rather arranged on the pot. An engaging element guided into the guiderail is manipulated by the rotating locking ring, specifically in such a way that as to force the engaging element through the guideway, and in the process simultaneously displace it in both a radial direction and in an axial direction of the pot. Along its displacement path, the displaced engaging element acts on a corresponding partial area of the cover, and thereby locks the cover with the pot by displacing the cover in an axial direction toward the pot and tensioning it with the latter.

Aside from the preparation vessel described above, the invention further proposes an electric motor-driven food processor, in particular a mixing device, wherein the food processor has a base unit and a preparation vessel, which can be connected with a receiving area of the base unit, and has a pot and a cover that closes a pot opening, wherein the preparation vessel is further designed according to one of the embodiments described above, and the base unit has an activating assembly, which is set up to activate the locking assembly of the preparation vessel with the base unit and preparation vessel connected with each other. The features and advantages of the preparation vessel thus correspondingly also arise for the electric motor-driven food processor. This results in a food processor overall that can be operated with a plurality of differently designed preparation vessels. In particular, the proper function of the food processor no longer depends on a specific height of a preparation vessel. Rather, the preparation vessel according to the invention now provides its own locking assembly, so that the base unit of the food processor need no longer have a locking assembly for the preparation vessel. The pot of the preparation vessel can have a plurality of varying heights, and still be connected with the base unit in such a way that the cover can be optimally locked with the pot. In any event, the pot is designed in such a way that its pot foot has an activating element for activating the locking assembly of the preparation vessel, wherein an activating assembly allocated to the base unit corresponds to the activating element, and can activate the latter. The base unit has as the activating assembly an electric motor with an allocated gearbox, which acts on the activating element of the locking assembly, and thereby initiates a locking of the cover with the pot.

It is further proposed that the food processor have a safety device for locking the preparation vessel on the base unit of the food processor, wherein the safety device has a safety element movably mounted on the preparation vessel, which can be moved behind an undercut of the base unit, or wherein the safety device has a safety element movably mounted on the base unit, which can be moved behind an undercut of the preparation vessel, wherein the activating assembly of the base unit is designed to also drive the safety element of the safety device simultaneously and additionally to activating the locking assembly. The activating mechanism for locking the cover can thus simultaneously also be used for locking the preparation vessel on the base unit. To this end, for example, a projection or undercut can be arranged on the gearbox of the activating assembly of the base unit, which at a specific rotational angle of a gearbox element engages into a counter-contour secured on the pot. Depending on the rotational angle of the gearbox element, the pot can then either be separated from the base unit or remain fixedly connected with it. Alternatively, a projection or undercut can also be arranged on a partial area of the preparation vessel, for example on a movable element of the drive assembly of the preparation vessel.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 is a sectional view of a preparation vessel according to a first embodiment;

FIG. 4 is a top view of the preparation vessel;

FIG. 5 is a pot opening of the preparation vessel with a locking element;

FIG. 6 is a partial area of a cover of the preparation vessel and a locking element in a first position;

FIG. 7 is the partial area of the cover of the preparation vessel and the locking element in a second position;

FIG. 8 is the partial area of the cover of the preparation vessel and the locking element in a third position;

FIG. 9a is a locking assembly according to a second embodiment in a first position;

FIG. 9b is a side view according to FIG. 9a;

FIG. 10a is the locking assembly according to FIG. 9a in a second position;

FIG. 10b is a side view according to FIG. 10a;

FIG. 11a is the locking assembly according to FIG. 9a and FIG. 10a in a third position;

FIG. 11b is a side view according to FIG. 11a;

FIG. 12a is a perspective view of the position shown on FIG. 11a and FIG. 11b, viewed at an inclination from below;

FIG. 12b is a position of a detection device given a cover properly connected with the pot;

FIG. 12c is a position of the detection device without the cover;

DETAILED DESCRIPTION OF PREFERRED EMBODIMENTS

Figure 1:
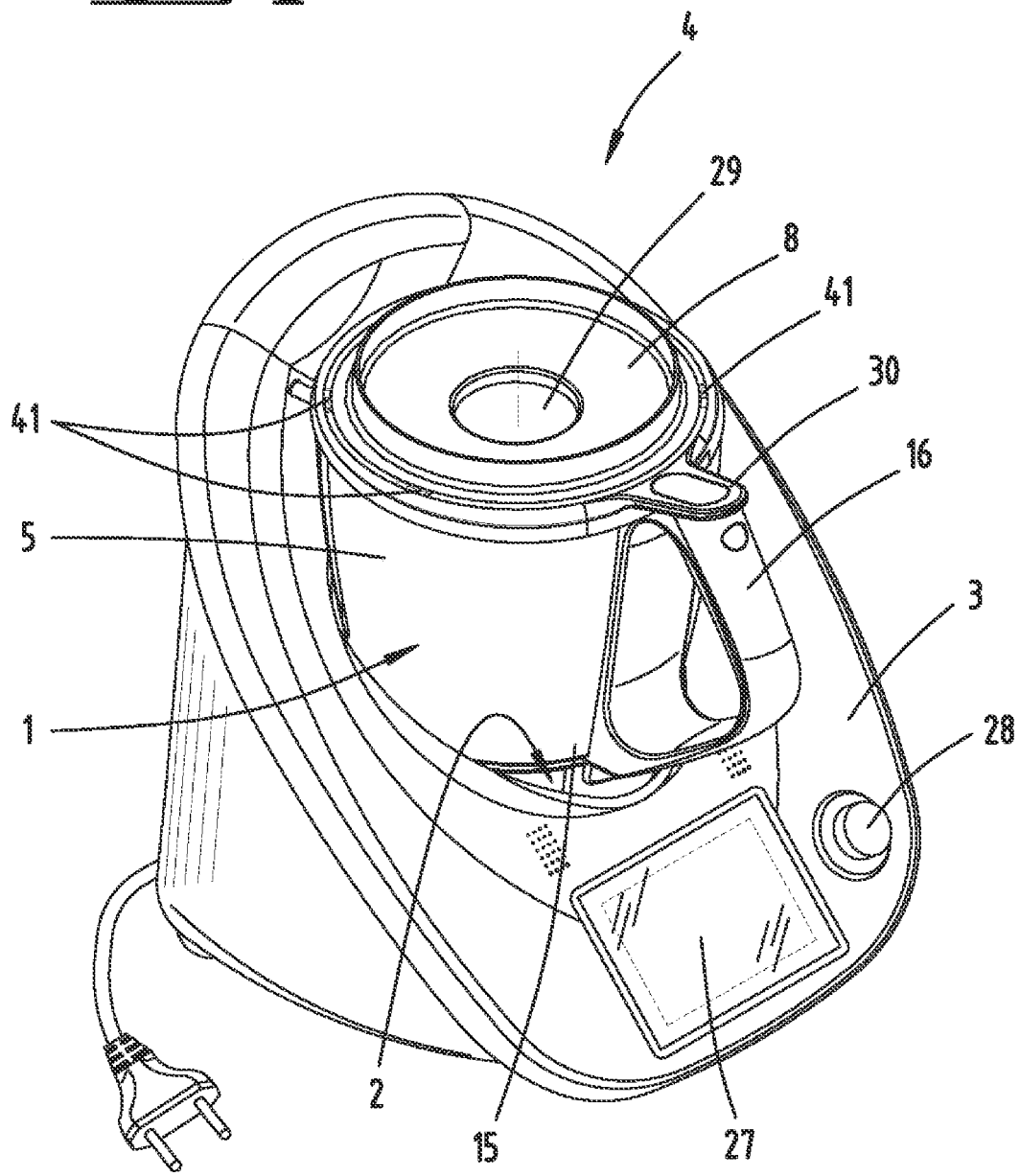
FIG. 1 is a food processor with a preparation vessel.

FIG. 1 shows a food processor 4 with a base unit 3, which has a receiving area 2 for connection with a preparation vessel 1. The base unit 3 of the food processor 4 has a display 27 for displaying functions of the food processor 4 and possibly recipes that can be prepared with the food processor 4. Located next to the display 27 is a switch 28, which serves to turn the food processor 4 on and off, and to activate input commands or the like. The preparation vessel 1 has a pot 5 with a pot handle 16 and a pot foot 6, which is used for connection with the receiving area 2 of the food processor 4, as well as a cover 8 with a cover opening 28 and a cover handle 30. For example, ingredients can be introduced into the pot 5 of the preparation vessel 1 through the cover opening 29.

Figure 2:
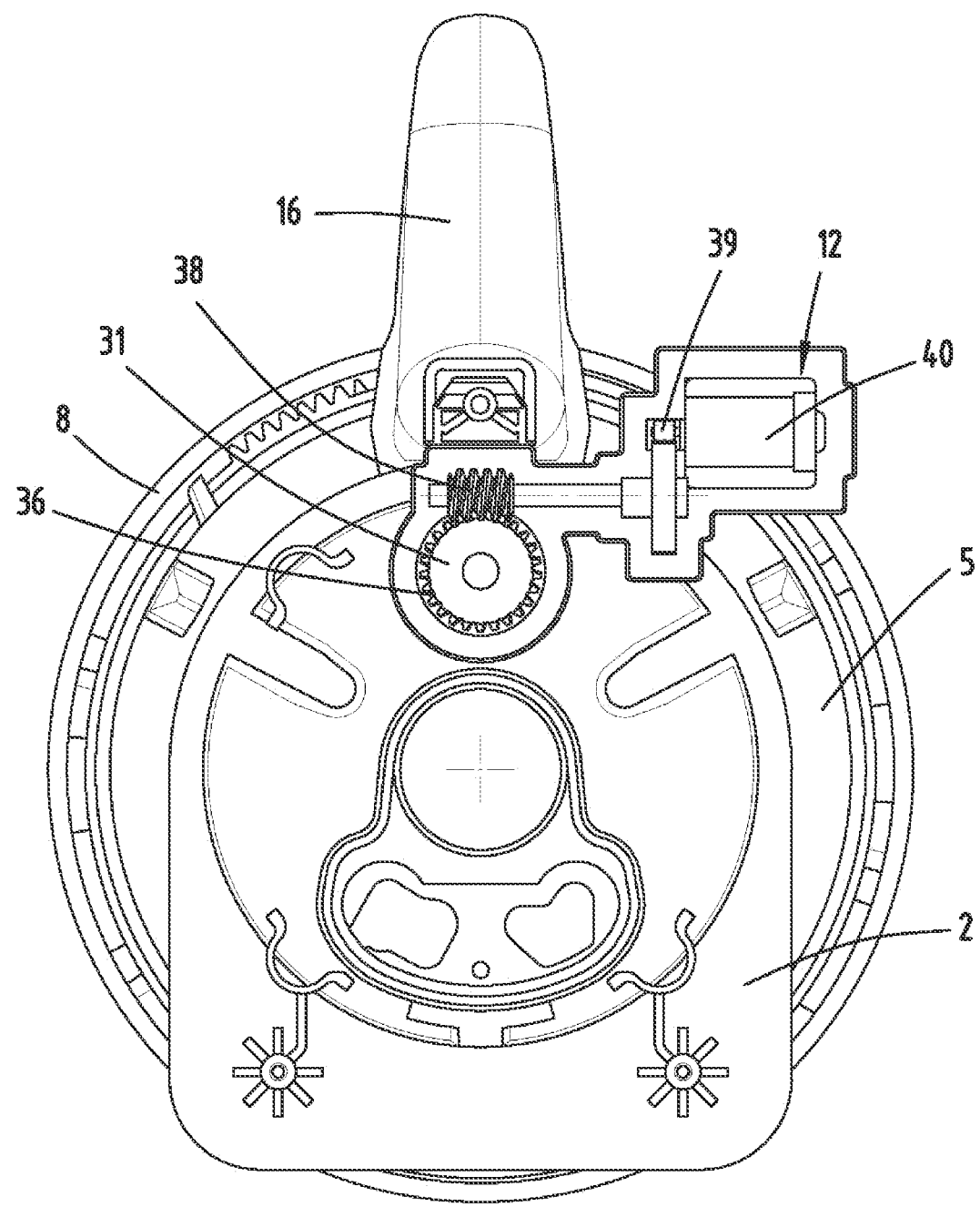
FIG. 2 is a bottom view of a receiving area of the food processor with a preparation vessel.

Shown in FIGS. 2 and 3 is a detailed view of a locking assembly 9 of the preparation vessel 1, by means of which the pot 5 and cover 8 of the preparation vessel 1 can be locked with each other. The receiving area 2 of the base unit 3 of the food processor 4 has an activating assembly 12 for acting on an activating element 11 of the locking assembly 9 of the preparation vessel 1, so that the food processor 4 can activate a locking mechanism of the preparation vessel 1, so as to lock the cover 8 with the pot 5. For example, the activating assembly 12 of the food processor 4 here specifically has an electric motor 40, which drives a spur gear 39 and a worm gear 38 connected therewith. The worm gear 38 in turn acts on a coupling element 31 of the base unit 3. The coupling element 31 has a tooth system 36, which can engage into the worm gear 38. The coupling element 31 is used for coupling with the activating element 11 of the preparation vessel 1. The activating element 11 of the locking assembly 9 in turn acts on a drive assembly 13, which drives a locking element 10 of the locking assembly 9 that is mounted on the pot 5 so that it can rotate in a peripheral direction. The locking element 10 cannot be displaced in an axial direction of the pot 5. For example, axial displacement is here prevented by a collar 49 formed on the pot opening 7 and the handle 16 of the pot 5. The drive assembly 13 has a drive element 14, which here for example is designed like a rotating shaft. The rotating shaft is guided through a wall 15 of the handle 16 of the preparation vessel 1, and reaches up to the height of a pot opening 7 of the pot 5, where the locking element 10 of the locking assembly 9 is located. As visible in particular on FIGS. 4 and 5, the locking element 10 is designed as a bayonet ring. The bayonet ring has active elements 17 for locking the cover 8 with the pot 5, which can engage into corresponding bayonet openings 41 of the cover 8. In addition, the locking element 10 has a tooth system 37, which corresponds with a tooth system of the drive element 14 (not shown in any more detail), so that a rotation of the locking element 10 around the pot opening 7 takes place given a rotation of the drive element 14. In order to prevent the cover 8 from also turning during rotation of the locking element 10, corresponding stop elements (not shown) can be provided on the pot 5 and cover 8, for example in the area of the handle 16 and cover handle 30.

The invention according to this exemplary embodiment of a locking assembly 9 of a preparation vessel 1 functions in such a way that a user connects the preparation vessel 1 with the base unit 3 of the food processor 4. In the process, a coupling takes place between the coupling element 31 of the receiving area 2 of the food processor 4 and the activating element 11 of the locking assembly 9 of the preparation vessel 1. If the user now brings about a locking of the pot 5 with the cover 8, for example via the display 27 or the switch 28 of the food processor 4, or such a locking is automatically initiated by a control device of the food processor 4, the electric motor 40 of the food processor 4 allocated to the locking assembly 9 drives the spur gear 39, the screw gear 38 and the coupling element 31 of the food processor 4, thereby resulting in a rotation of the activating element 11, and hence also of the drive element 14 of the drive assembly 13 for the locking element 10. During placement of the cover 8 on the pot 5, the user has already superposed the cover handle 30 with the handle 16 (see FIG. 1). As a result, the active elements 17 of the locking element 10 are positioned in proximity to the bayonet openings 41 of the cover 8. The drive assembly 13 of the preparation vessel 1 now rotates the locking element 10, and thereby also displaces the active elements 17 relative to the bayonet openings 41 of the cover 8, until an end position, and hence also the bayonet lock between the corresponding partial areas of the pot 5 and cover 8, has been reached. The active elements 17 of the locking element 10 (or alternatively of the cover 8) preferably have ramps 18, which cause the cover 8 to be pulled in the direction of the pot opening 7, and thus press the cover 8 onto the pot 5, closing the latter. Even though not depicted on FIGS. 2 to 5, the locking element 10, specifically the bayonet ring, can also be arranged on the cover 8 instead of on the pot 5.

FIGS. 6 to 8 show a schematic diagram of the bayonet lock between the pot 5 and cover 8 depicted on FIG. 4, wherein the cover 8 has ramps 18 along which the active element 17 of the locking element 10 can glide. FIG. 6 shows a partial area of the cover 8 with a bayonet opening 41, which serves to receive the active element 17 of the locking element 10. In the state shown on FIG. 6, the active element 17 is still located completely next to the ramp 18 of the cover 8. In an optimal initial position, however, the cover 8 is placed on the pot 5, so that the active element 17 of the locking element 10 is positioned on the foot of the ramp 8 in such a way that the active element 17 proceeding therefrom can glide onto the ramp 18 during rotation of the locking element 10, and finally protrudes through the bayonet opening 41 as depicted on FIG. 7. A nose 44 of the active element 17 here engages beyond the upper side of the cover 8, and pulls the cover 8 downward in the direction of the pot 5. By contrast, FIG. 8 shows a situation in which the cover 8 rests on the pot 5, and hence also the locking element 10, improperly, e.g., at a slight inclination. As a result, the active element 17 bumps against a side edge 50 of the ramp 18, so that the active element 17 cannot be rotated to the left, and thus cannot get onto the ramp 18. The user is thus unable to further rotate the locking element 10 and close the bayonet lock. If the cover 8 is missing entirely, the locking element 10 can be rotated relative to the pot 5 by a defined maximum measure, since the nose 44 of the active element 17 does not bump against an edge of the bayonet opening 41 of the cover 8. A detection device (not shown in any more detail) that detects a rotational path or rotational angle of the locking element 10 or active element 17 relative to the pot 5 can then, based on the amount of rotation, determine whether the cover 8 was properly connected with the pot 5 or not. If it is found that a locking process has failed, a corresponding warning can be output to the user via the display 27 of the food processor 4, for example.

FIGS. 9 to 12 show another possible embodiment for a preparation vessel 1 according to the invention. The preparation vessel 1 likewise has a pot 5, a cover 8 and a locking assembly 9 for locking the pot 5 with the cover 8. The locking assembly 9 has a locking element 10, which likewise is designed as a rotatable ring that is rotatably mounted on the pot 5. The locking assembly 9 further has an intermediate element 19 that can be manipulated by means of the locking element 10. The intermediate element 19 is a pivotable lever, which is mounted on the pot 5 so that it can pivot around a pivot axis 34, and has a projection 42 formed on a free end area that can grip behind a collar 46 of the cover 8, as discernible on FIGS. 10*b* and 11*b*. The projection 42 is located at the free end area of the intermediate element 19 that faces away from the pivot axis 34. Mounting the intermediate element 19 on the pivot axis 34 enables both a pivoting parallel to the wall 15 of the pot 5, as well as a pivoting away from the wall 15, wherein the projection 42 on the pot 5 faces outward. Additionally allocated to the intermediate element 19 is a detection device 33, which is set up to detect a locking state between the pot 5 and cover 8. Further allocated to the intermediate element 19 is a hold-down clamp 35, along with a restoring spring 32 (see FIG. 12*a*), which in relation to the rotation around the pivot axis 34 exposes the intermediate element 19 to a restoring force that acts in the direction of the locking element 10. By including an intermediate element 19 in the design of the locking assembly 9, the pot 5 can be locked with the cover 8 even if the user places the cover 8 on the pot 5 in any rotational position.

The operating principle will be explained in more detail below with reference to FIGS. 9 to 11, wherein FIGS. 9*b*, 10*b* and 11*b* each present a view of the preparation vessel 1 according to FIGS. 9*a*, 10*a* and 11*a* rotated by a respective 90°. Only one respective intermediate element 19 is shown, wherein the pot 5 can also have several intermediate elements 19 arranged in the peripheral direction of the pot 5, which interact with the locking element 10. For example, the locking element 10 is driven as described above with reference to FIGS. 2 and 3 by a drive assembly 13, which in turn is driven by an activating assembly 12 of a base unit 3 of the food processor 4. The locking element 10 has guide contours 10 that are visible in particular on FIG. 12*a*, which cause the intermediate element 19 to pivot around the pivot axis 34 when the locking element 10 rotates relative to the pot 5, and hence also relative to the intermediate element 19. Among other things, the guide contours 51 have a shoulder 45 (see FIG. 12*a*) of the locking element 10 on which the detection device 33 glides along with the cover 8 properly placed on the pot 5, and thus detects that the user has properly placed the cover 8 on the pot 5.

In the situation shown on FIGS. 9*a* and 9*b*, the cover 8 still rests unlocked on the pot 5, wherein the intermediate element 19 is in an initial position, in which the restoring spring 32 is relaxed. A gasket (not depicted here) can be arranged on the bottom side of the cover 8, which has a material elasticity with a restoring force suitable for spacing the cover 8 apart from the pot 5 while it still rests loosely on the pot 5. If the locking element 10 is now rotated around the pot 5 by means of the drive assembly 13, the guide contour 51 formed on the locking element 10 initially causes the intermediate element 19 to pivot in a direction going away from the pot 5, so that the projection 42 can grip behind a collar 46 of the cover 8, as illustrated on FIG. 10*b*. This can be achieved by a ramp of the guide contour 51, which in relation to a radial direction of the ring-shaped locking element 10 acts laterally against the intermediate element 19, and thereby spaces it apart from the wall 15 of the pot 5. The axial position of the cover 8 relative to the pot 5 does not initially change. Only the projection 42 of the intermediate element 19 grips behind the collar 46 of the cover 8, and thus centers the cover 8 via the pot opening 7. Continuing to rotate the locking element 10 then leads to the situation depicted on FIGS. 11*a* and 11*b*. To this end, the intermediate element 19 is pressed downward by the guide contour 51 of the locking element 10 in relation to the display layer of the figures, i.e., away from the locking element 10. The projection 42 of the intermediate element 19 here takes the cover 8 along, and pulls it into a lower end position. The cover 8 is fixed in this end position by means of the intermediate element 19, which as shown on FIGS. 11*a* and 11*b* is supported against the locking element. As a result, the cover 8 is fixedly locked on the pot 5. In order to ensure that the intermediate element 19 stays in the locked end position even if high forces from inside of the pot 5 are acting on the cover 8, the hold-down clamp 35 prevents the intermediate element 19 from pivoting back. In order to unlock the cover 8 again, the locking element 10 is rotated in the opposite direction, back into the initial position according to FIGS. 9*a* and 9*b*. Following the restoring force of the restoring spring 32, the intermediate element 19 is then pivoted in the direction of the locking element 10 again, i.e., toward the top on the figures, where it can engage into a corresponding recess 48 of the guide contour 51. As a result, the intermediate element 19 is simultaneously again pivoted with its projection 42 against the wall 15 of the pot 5, so that the projection 42 no longer engages behind the collar 46 of the cover 8, but as depicted on FIG. 9*b* stands back behind the outer contour of the locking element 10.

FIGS. 12*a* to 12*c* illustrate the function of the detection device 33 allocated to the intermediate element 19. The detection device 33—as also the case with the intermediate element 19—can be pivoted around the pivot axis 34, wherein the restoring spring 32 also exerts a restoring force on the detection device 33 that is directed toward the shoulder 45. In the end position of the intermediate element 19 shown on FIG. 12*a*, in which the cover 8 is properly locked with the pot 5, the detection device 33 is supported on the shoulder 45 of the guide contour 51 of the locking element 10. The position of the detection device 33 is here recognized as a completed locking position. The detection device 33 is pressed against the shoulder 45 of the guide contour 51 by the restoring spring 32. The locking element 10 has another recess 48, into which the detection device 33 can engage with the cover 8 not put on. However, if the cover 8 was put on correctly, it presses against a projection 47 of the detection device 33, so that the detection device 33 cannot pivot into the recess 48. By contrast, if the cover 8 is not or incorrectly located on the pot 5, the detection device 33 pivots into the recess 48, and prevents a rotation of the locking element 10. Only if the cover 8 has been correctly placed on the pot 5 is the detection device 33 pivoted downward from the cover 8 into the position depicted on FIG. 12*b*, and the locking element 10 can be further rotated. For example, a rotational position of the locking element 10 can be detected by determining a rotational speed of a drive shaft of a drive motor of the locking assembly 9. For example, if the cover 8 has not been properly placed on the pot 5, the locking element 10 is blocked before a defined rotational position of the locking element 10 has been reached. This state is then recognized as a cover 8 that has been incorrectly placed or is not even present. By contrast, if the cover 8 has been put on correctly, the locking element 10 can continue to rotate until the defined rotational position has been reached. This is then interpreted as a correctly locked cover 8. A locking state of the cover 8 can be detected at several positions by arranging several detection devices 33 in the peripheral direction of the pot 5. As a result, even a cover 8 placed on the pot 5 at a slant, for example, can be recognized as an error, since it is sufficient for at least one of several detection devices 33 not to be activated, thereby blocking a continued rotation of the locking element 10.

FIGS. 13 to 17 show another embodiment of a locking assembly 9 according to the invention. In this embodiment, the function of locking the cover 8 with the pot 5 is likewise independent of a specific rotational position of the cover 8 on the pot 5. The user need not make sure and place the cover 8 on the pot 5 in a specific rotational position. The locking assembly 9 likewise once again has a locking element 10 rotatably mounted on the pot 5, which here acts on an engaging element 22 that is guided in a guiderail 20 formed or arranged on the pot 5, and protrudes from the guiderail 20 with an end-side partial area 43. The guiderail 20 has a spiral guideway 21, which is wound around a spiral axis 23 facing radially outward in relation to the interior of the pot 5. The rotating locking element 10 drives the engaging element 22 by acting on the end-side partial area 43 in such a way that the engaging element 22 is guided by the spiral guideway 21 of the guiderail 20. As described in more detail below with reference to FIGS. 13 to 17, the engaging element 22 is here displaced in both the direction of the spiral axis 23 and in the peripheral axis of the guiderail 20. FIGS. 13a, 14a, 15a, 16a and 17a show the engaging element 22 of the locking assembly 9 in different locking positions. FIGS. 13b, 14b, 15b, 16b and 17b depict the operating principle of the respective position. FIGS. 13c, 14c, 15c, 16c and 17c show a cross section of the locking assembly 9.

Figure 13A:
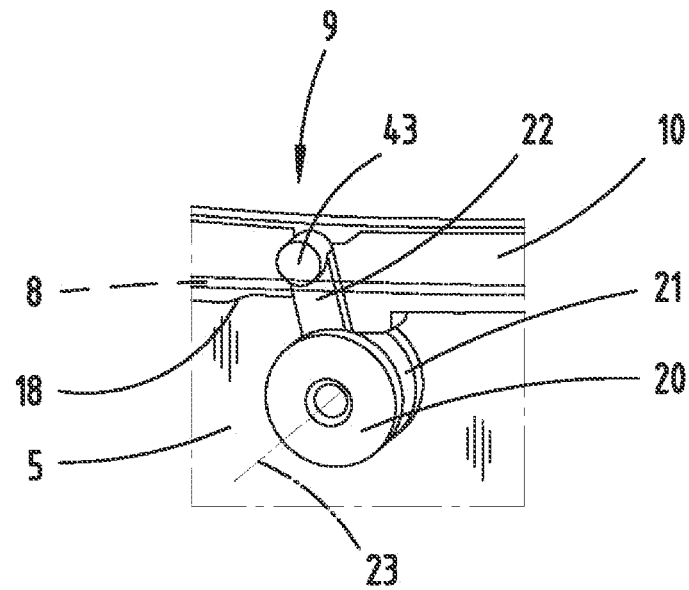
FIG. 13a is a locking assembly according to another embodiment in a first position.
Figure 13B:
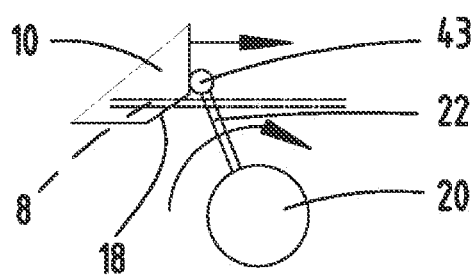
FIG. 13b is the locking assembly according to FIG. 13a as an outlined operating principle.
Figure 13C:
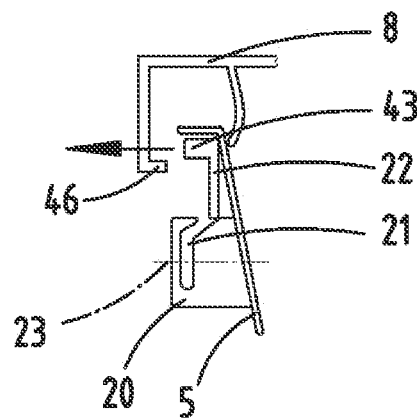
FIG. 13c is the illustration according to FIG. 13b in a side view.
Figure 14A:
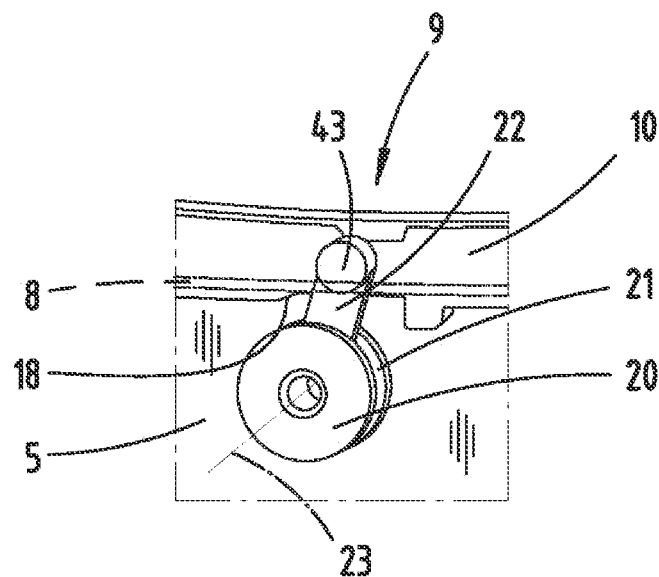
FIG. 14a is a locking assembly according to another embodiment in a first position.
Figure 14B:
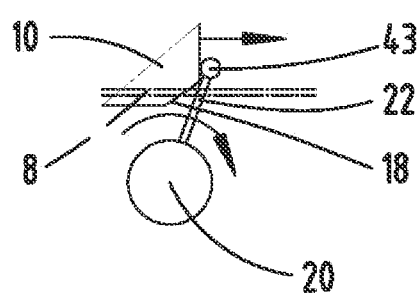
FIG. 14b is the locking assembly according to FIG. 14a as an outlined operating principle.
Figure 14C:
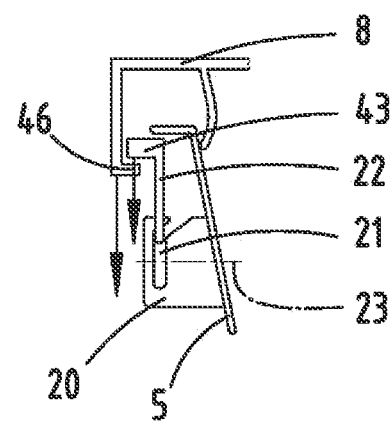
FIG. 14c is the illustration according to FIG. 14b in a side view; =
Figure 15A:
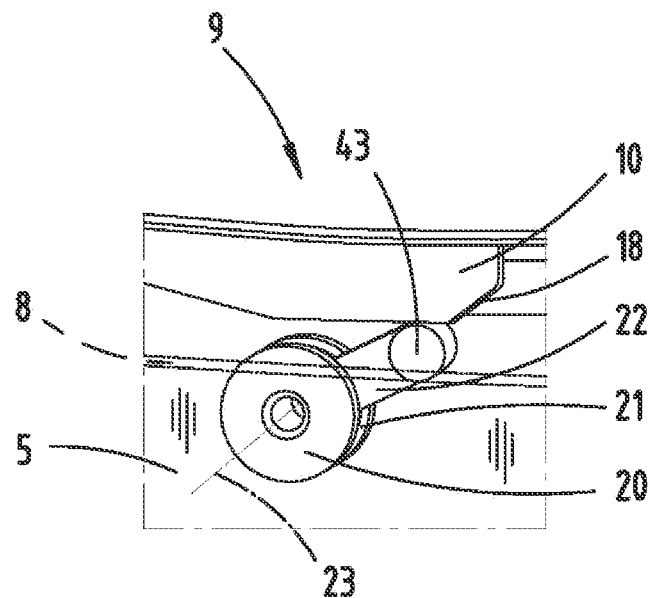
FIG. 15a is a locking assembly according to another embodiment in a first position.
Figure 15B:
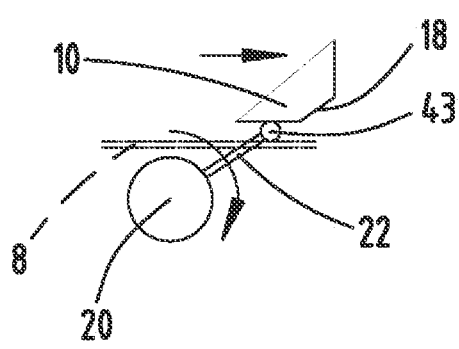
FIG. 15b is the locking assembly according to FIG. 15a as an outlined operating principle.
Figure 15C:
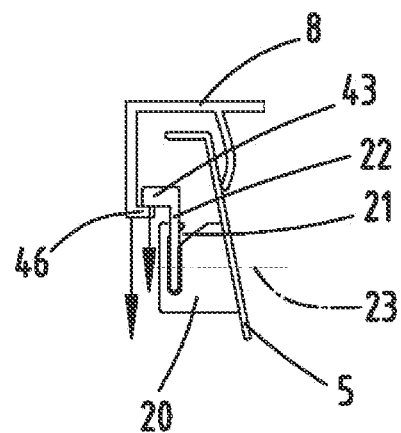
FIG. 15c is the illustration according to FIG. 15b in a side view.
Figure 16A:
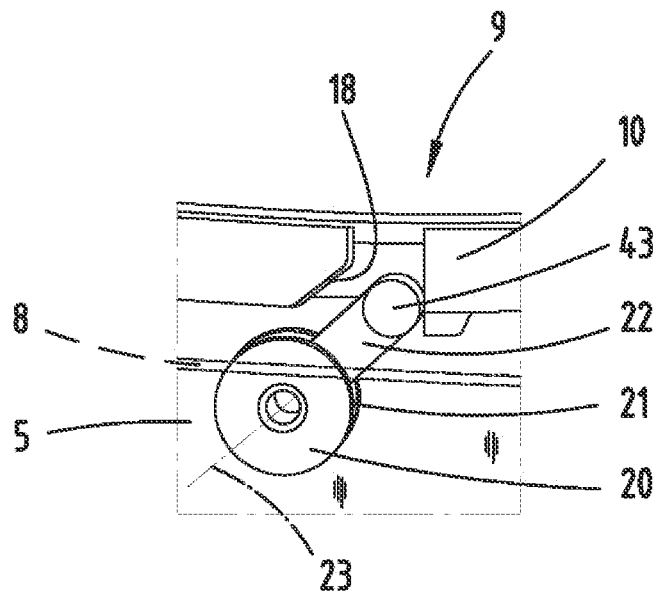
FIG. 16a is a locking assembly according to another embodiment in a first position.
Figure 16B:
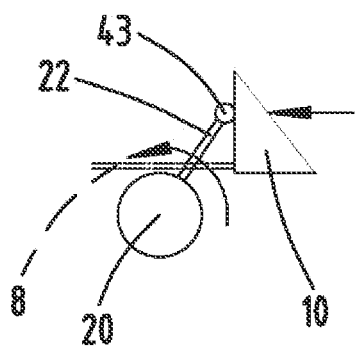
FIG. 16b is the locking assembly according to FIG. 16a as an outlined operating principle.
Figure 16C:
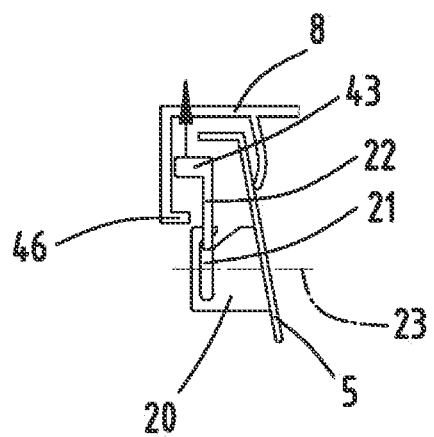
FIG. 16c is the illustration according to FIG. 16b in a side view.
Figure 17A:
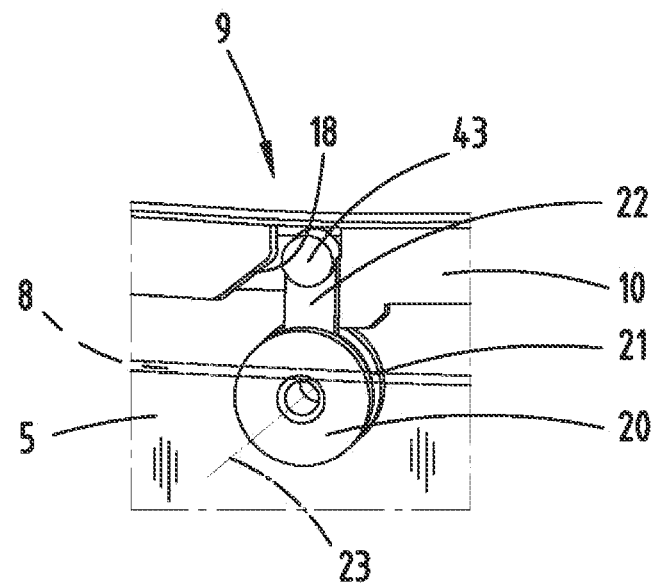
FIG. 17a is a locking assembly according to another embodiment in a first position.
Figure 17B:
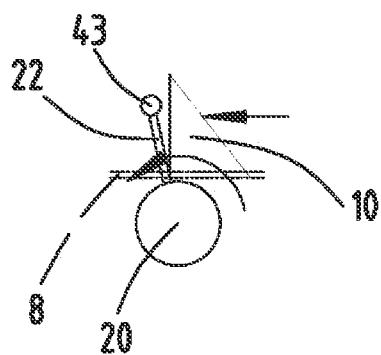
FIG. 17b is the locking assembly according to FIG. 17a as an outlined operating principle.
Figure 17C:
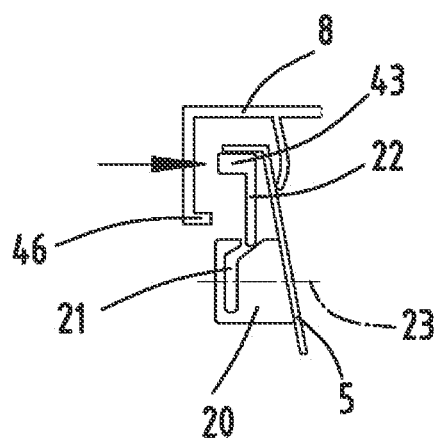
FIG. 17c is the illustration according to FIG. 17b in a side view.

FIGS. 13a, 13b and 13c initially show a starting position of the engaging element 22, in which the end-side partial area 43 of the engaging element 22 does not yet grip behind the collar 46 of the cover 8. With the locking element 10 rotating to the right on the figures (for example, see FIG. 13b), the partial area 43 glides along on a ramp 18 of the locking element 10, and is pivoted toward the right as shown on FIGS. 14a and 14b. As discernible in particular on FIG. 14c, this causes the engaging element 22 to initially glide along the guideway 21 of the guiderail 20 to the outside, i.e., away from the pot 5, until the hooked partial area 43 of the engaging element 22 grips behind the collar 46 of the cover 8, and tensions it in relation to a radially outward direction (as viewed proceeding from the interior of the pot 5). As the locking element 10 continues to rotate, the engaging element 22 tilts further to the right as depicted on FIGS. 15a, 15b and 15c, following the ramp 18 of the locking element 10. As a result, the engaging element 22 is displaced further along the guideway 21 of the guiderail 20, and moved into the end position shown on FIG. 15c, in which the cover 8 is pulled completely onto the pot 5, and also tensioned in a radial direction. Proceeding from this optimally locked end position of the locking assembly 9, the cover 8 can again be loosened from the pot 5 by activating the locking assembly 9 in the opposite direction, i.e., by now rotating the locking element 10 to the left in relation to the illustration on the figures. FIGS. 16 and 17 show the positions of the engaging element 22 that then follow. The engaging element 22 follows the guide contour 51 of the locking element 10 even during the release motion for unlocking the cover 8. As shown on FIGS. 16a, 16b and 16c, the engaging element 22 is here initially lifted by means of the guiderail 20 to an extent where the partial area 43 is no longer in contact with the collar 46 of the cover 8, and then, as shown on FIGS. 17a to 17c, displaced radially inward until the cover 8, as evident in particular from FIG. 17c, can be loosened from the pot 5 without the partial area 43 of the engaging element 22 bumping in front of the collar 46 of the cover 8. The cover 8 can then be removed from the pot 5.

Figure 18A:
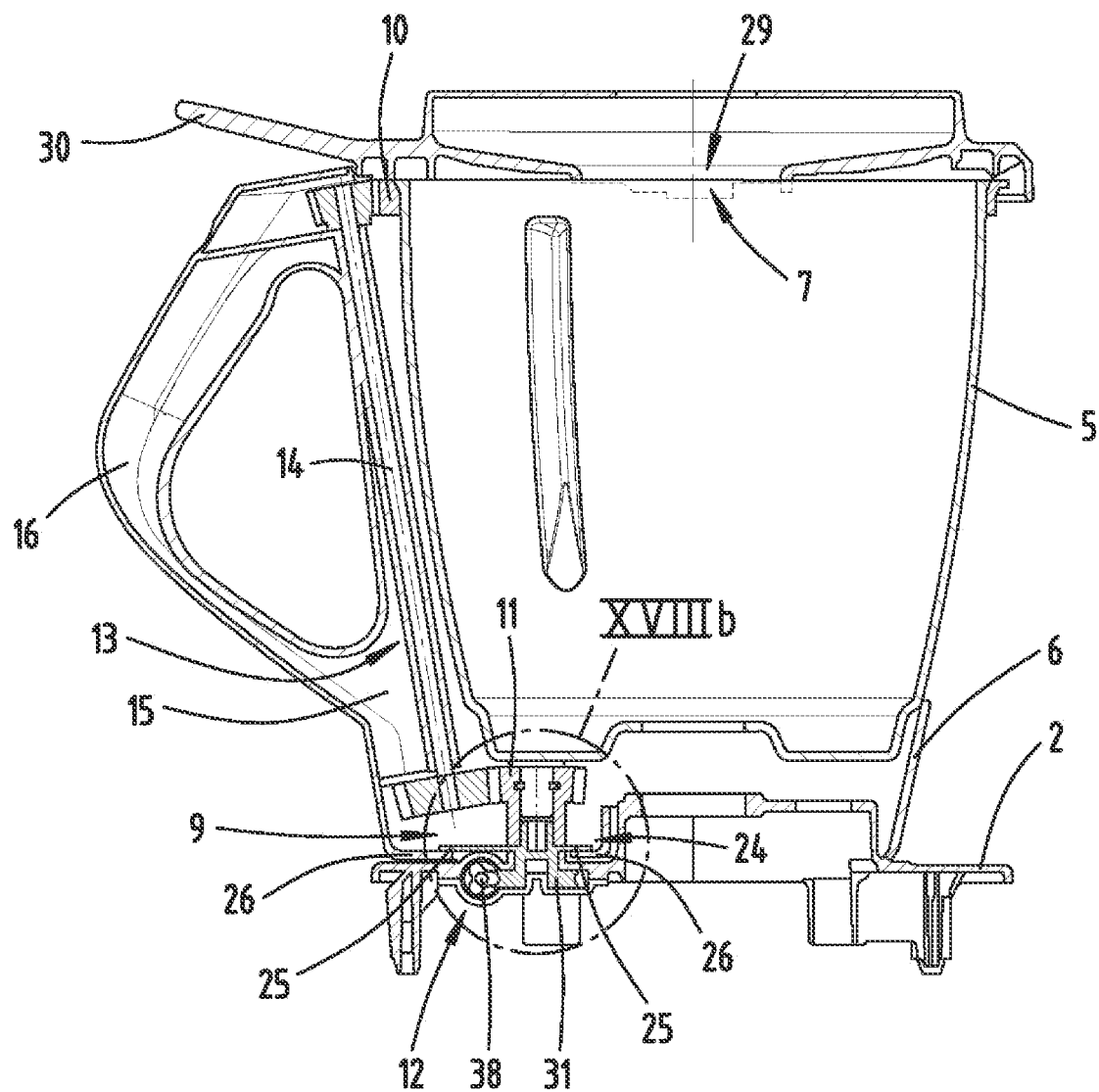
FIG. 18a, 18b is a preparation vessel with a safety device for locking the preparation vessel on a base unit of a food processor.
Figure 18:
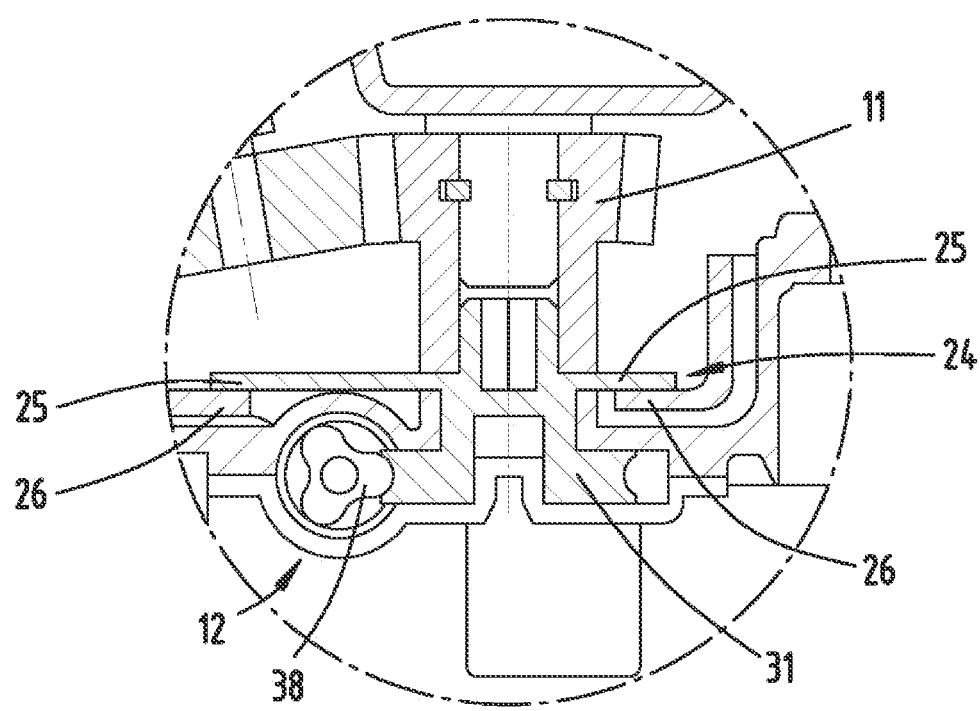

Finally, FIGS. 18a and 18b show a special embodiment of a food processor 4 according to the invention, on whose receiving area 2, for example here specifically a coupling element 31, two radially outwardly facing winglike safety elements 25 are arranged, which grip behind corresponding undercuts 26 of the pot foot 6 of the preparation vessel 1. The safety device 24 locks the preparation vessel 1 with the base unit 3 of the food processor 4 when the coupling element 31 of the activating assembly 12 is located in a rotational position that corresponds to a locked position of the cover 8 on the pot 5. As a result, the preparation vessel 1 is properly locked, i.e., meals contained in the pot 5 cannot leak out of the pot 5, while the preparation vessel 1 is simultaneously secured to the base unit 3 of the food processor 4 in such a way that the preparation vessel 1 cannot be separated from the base unit 3. Both the locking assembly 9 for the cover 8 and the safety device 24 for locking the preparation vessel 1 on the base unit 3 are operated by the same activating assembly 12 of the food processor 4, so that only a single electric motor 40 is required for performing several locking functions.

Although only a few embodiments of the present invention have been shown and described, it is to be understood that many changes and modifications may be made thereunto without departing from the spirit and scope of the invention.

REFERENCE LIST

1 Preparation vessel
2 Receiving area
3 Base unit
4 Food processor
5 Pot
6 Pot foot
7 Pot opening
8 Cover
9 Locking assembly
10 Locking element
11 Activating element
12 Activating assembly
13 Drive assembly
14 Drive element
15 Wall
16 Handle
17 Active element
18 Ramp
19 Intermediate element
20 Guiderail
21 Guideway
22 Engaging element
23 Spiral axis
24 Safety device
25 Safety element
26 Undercut
27 Display
28 Switch
29 Cover opening
30 Cover handle
31 Coupling element
32 Restoring spring
33 Detection device
34 Pivot axis
35 Hold-down clamp
36 Tooth system
37 Tooth system
38 Worm gear
39 Spur gear
40 Electric motor 41 Bayonet opening
42 Projection
43 Partial area
44 Nose
45 Shoulder
46 Collar
47 Projection
48 Recess
49 Collar
50 Side edge
51 Guide contour

What is claimed is:

1. A preparation vessel for connection with a receiving area of a base unit of an electric motor-driven food processor, comprising:
a pot with a pot opening,
a pot foot that is configured to be connected with the receiving area,
a cover that closes the pot opening of the pot, and
a locking assembly with a locking element configured for locking the pot with the cover,
wherein the pot foot has at least one activating element configured for activating the locking assembly, and wherein the activating element is arranged on the pot foot in such a way that the activating element can be activated by a corresponding activating assembly of the receiving area of the food processor,
wherein the locking element is a locking ring that is rotatably mounted on the pot and surrounds the pot opening, or is rotatably mounted on the cover and surrounds the pot opening when the pot opening is closed by the cover, and wherein the locking element has a drive assembly that is set up to rotate the locking element around the pot opening.

2. The preparation vessel according to claim 1, wherein the locking assembly has a drive assembly that drives the locking element and is mechanically operatively connected with the activating element.

3. The preparation vessel according to claim 2, wherein the drive assembly has a drive element in the form of a rotating shaft, which proceeding from the pot foot up to the cover is guided through a wall of the pot and/or a handle of the pot.

4. The preparation vessel according to claim 1, wherein the locking element has at least one active element, which as the locking element rotates is designed to induce an axial displacement of the cover toward the pot and/or a tensioning of the cover acting radially to the outside.

5. The preparation vessel according to claim 4, wherein the active element is a protrusion configured to engage into a corresponding opening of the cover or pot to form a bayonet lock, wherein the active element or a partial area of the cover or pot has a ramp that ascends in a locking rotational direction, and induces an axial displacement of the cover relative to the pot, and thus a locking of the pot with the cover.

6. The preparation vessel according to claim 4, further comprising an intermediate element movably mounted on the pot or the cover, wherein the active element of the locking element is configured to press the intermediate element in an axial and/or radial direction against a partial area of the cover or pot during a rotation of the locking element, and thereby induce a locking of the pot with the cover.

7. The preparation vessel according to claim 1, further comprising a guiderail arranged on the pot with an engaging element mounted in a spiral guideway of the guiderail, wherein the guideway runs around a spiral axis that faces radially outward in relation to an interior of the pot, and wherein a rotation of the locking element produces an axial and radial displacement of the engaging element along the spiral guideway toward a partial area of the cover, until a partial area of the engaging element facing out of the guiderail abuts against the cover, thereby bringing about a locking of the pot with the cover.

8. An electric motor-driven food processor comprising:
the preparation vessel according to claim 1, and
the base unit having the receiving area,
wherein the base unit has an activating assembly that is configured to activate the locking assembly of the preparation vessel when the base unit and preparation vessel are connected with each other.

9. The food processor according to claim 8, further comprising a safety device configured for locking the preparation vessel on the base unit of the food processor, wherein the safety device has a safety element movably mounted on the preparation vessel and configured to be moved behind an undercut of the base unit, or a safety element movably mounted on the base unit and configured to be moved behind an undercut of the preparation vessel, wherein the activating assembly of the base unit is configured to also drive the safety element of the safety device simultaneously and additionally to activating the locking assembly.

10. A cover that is configured to close a pot opening of a pot of a preparation vessel,
wherein the cover comprises at least one bayonet locking element configured to engage into a correspondingly formed ramp-like bayonet locking element of the pot in order to induce an axial displacement of the cover in the direction of the pot, wherein the bayonet locking element of the cover comprises a bayonet opening or a collar, or
wherein the cover comprises a locking element configured for locking the pot with the cover, wherein the locking element is a locking ring that is rotatably mounted on the cover and is configured to surround the pot opening, and wherein the locking element has a drive assembly that is set up to rotate the locking element around the pot opening when the pot opening is closed by the cover.

11. The cover according to claim 10, wherein the locking element comprises the locking ring, and wherein the locking ring provides an element of a bayonet lock and/or wherein the locking ring provides a connecting link with ramps.

12. The cover according to claim 10, wherein the locking element has an active element, which as the locking element rotates is designed to induce an axial displacement of the cover toward the pot and/or a tensioning of the cover acting radially to the outside.

13. The cover according to claim 12, wherein the active element is configured to engage into a corresponding opening of the pot to form a bayonet lock, wherein the active element or a partial area of the cover has a ramp that ascends in a locking rotational direction, and induces an axial displacement of the cover relative to the pot, and thus a locking of the pot with the cover.

14. The cover according to claim 12, further comprising an intermediate element configured to be movably mounted on the cover, wherein the active element of the locking element is configured to press the intermediate element in an axial and/or radial direction against a partial area of the pot during a rotation of the locking element, and thereby induce a locking of the pot with the cover.

* * * * *